US006721503B1

United States Patent
Jokerst et al.

(10) Patent No.: US 6,721,503 B1
(45) Date of Patent: Apr. 13, 2004

(54) SYSTEM AND METHOD FOR BI-DIRECTIONAL OPTICAL COMMUNICATION USING STACKED EMITTERS AND DETECTORS

(75) Inventors: Nan Marie Jokerst, Atlanta, GA (US); Martin Anthony Brooke, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/384,112

(22) Filed: Aug. 26, 1999

Related U.S. Application Data

(60) Provisional application No. 60/098,049, filed on Aug. 26, 1998, and provisional application No. 60/097,946, filed on Aug. 26, 1998.

(51) Int. Cl.$^7$ .............................................. H04B 10/24
(52) U.S. Cl. ............................. 398/41; 398/135; 385/14
(58) Field of Search .......................... 398/41, 135, 140, 398/156, 164; 257/80, 81, 82, 84; 385/14

(56) References Cited

U.S. PATENT DOCUMENTS

| | | | | |
|---|---|---|---|---|
| 4,403,825 A | * | 9/1983 | Tangonan et al. | 385/14 |
| 4,493,113 A | * | 1/1985 | Forrest et al. | 359/152 |
| 4,705,346 A | * | 11/1987 | Miyawaki | 385/130 |
| 4,773,722 A | * | 9/1988 | Perino | 385/33 |
| 5,357,363 A | * | 10/1994 | Li et al. | 359/161 |
| 5,914,976 A | * | 6/1999 | Jayaraman et al. | 359/152 |
| 6,281,999 B1 | * | 8/2001 | Watson et al. | 359/152 |
| 6,301,035 B1 | * | 10/2001 | Schairer | 359/152 |
| 6,320,686 B1 | * | 11/2001 | Schairer | 359/152 |
| 6,437,891 B1 | * | 8/2002 | Chandrasekhar et al. | 359/152 |

OTHER PUBLICATIONS

Hamilton et al, Basic Integrated Circuit Engineering, 1975, pp. 96–99.*

Vendier, et al., "High Efficiency Thin–Film GaAs–based MSM Photodetectors," Electronics Letters, Feb. 15, 1996, vol. 32, No. 4, pp. 394–395.

Vendier, et al., "Stacked Silicon CMOS Circuits with a 40–Mb/x Through–Silicon Optical Interconnect," IEEE Photonics Technology Letters, Apr. 1998, vol. 10, No. 4, pp. 606–608.

Vendier, et al., "Thin–Film Inverted MSM Photodetectors," IEEE Photonics Technology Letters, Feb. 1996, vol. 8, No. 2, pp. 266–268.

Jokerst, et al., "Thin–Film Multimaterial Optoelectronic Integrated Circuits," IEEE Transactions on Components, Packaging, and Manufacturing Technology–Part B, Feb. 1996, vol. 19, No. 1, pp. 97–106.

* cited by examiner

*Primary Examiner*—John Tweel
(74) *Attorney, Agent, or Firm*—Thomas, Kayden, Horstemeyer & Risley, LLP

(57) ABSTRACT

Disclosed is a bidirectional optical link and method to facilitate bi-directional optical communications with a single optical fiber. Briefly described, the bi-directional optical link comprises a thin film detector having an upper surface facing a predetermined direction to receive incident light. Also, the link includes a thin film emitter stacked over the upper surface and oriented to direct a beam of light toward the predetermined direction. The thin film detector is relatively wide and flat, where the thin film emitter can be placed on the thin film detector while occluding only a portion of the thin film detector. Thus, the thin film detector can receive incident light from a single optical fiber facing the emitter/detector from the predetermined direction while at the same time emitting a beam of light into the same single optical fiber.

4 Claims, 6 Drawing Sheets

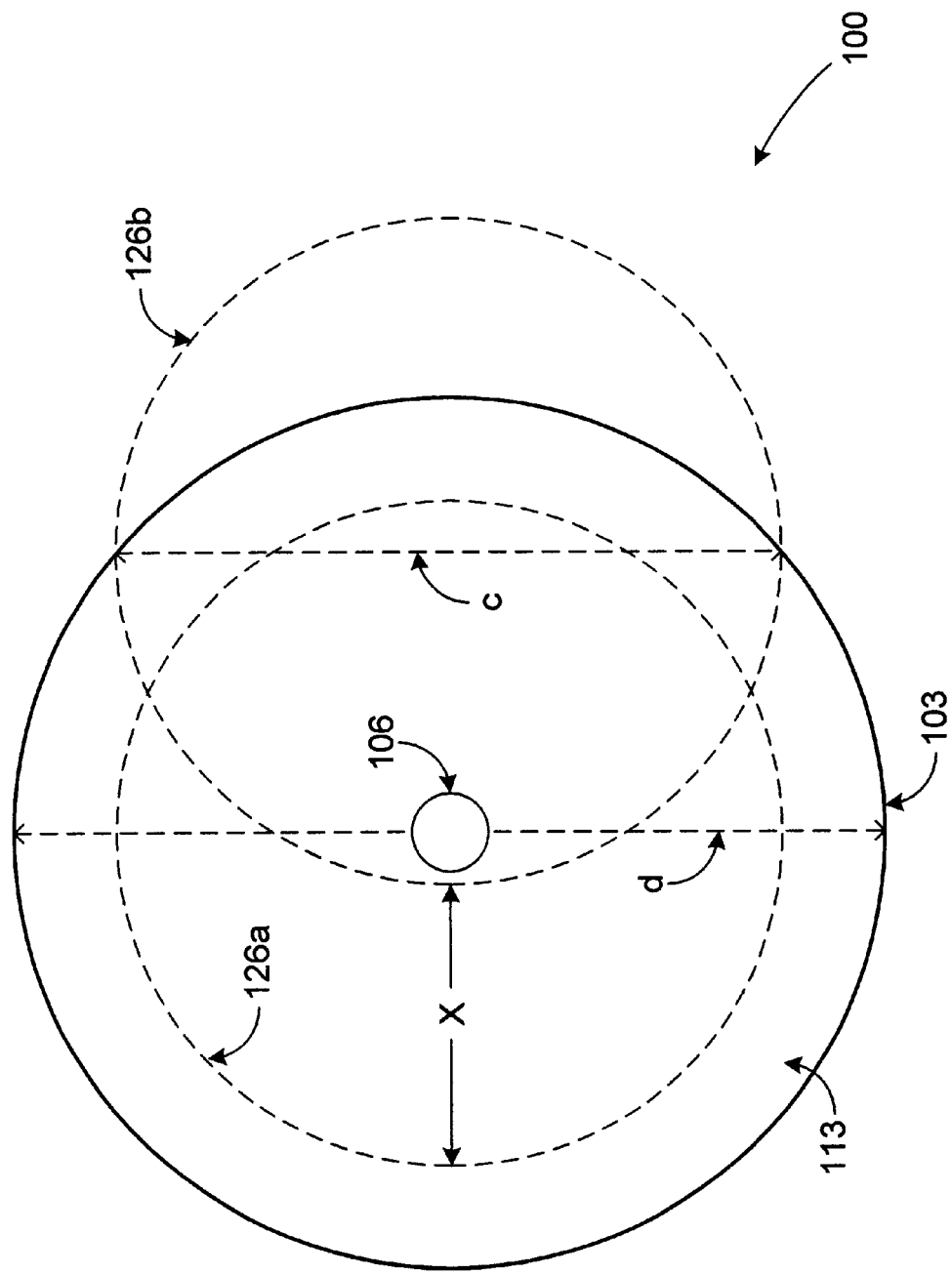

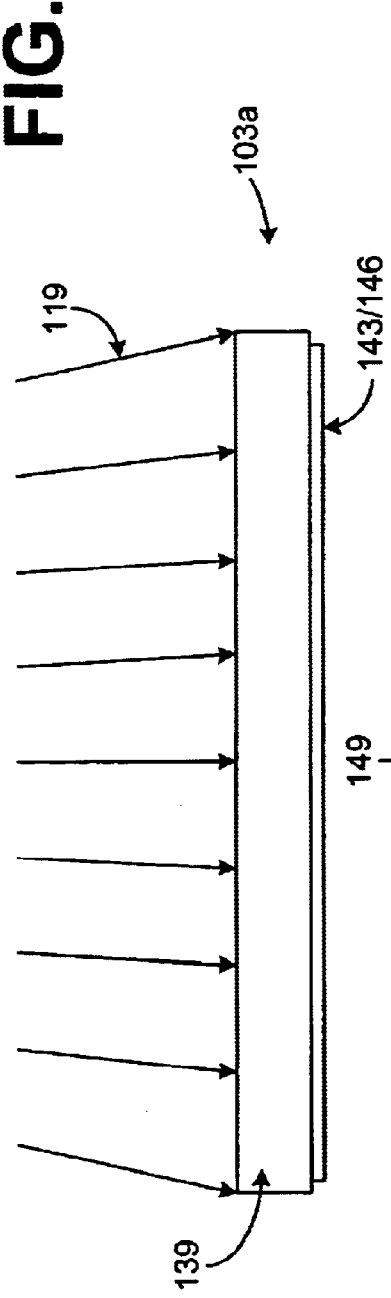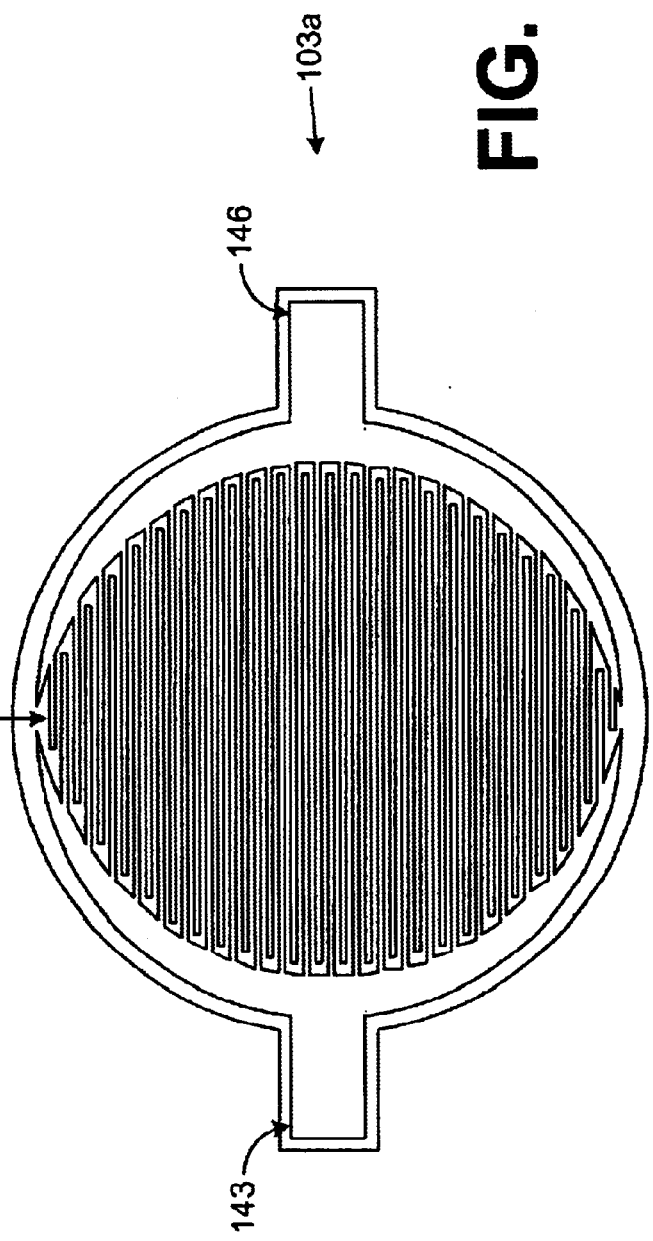

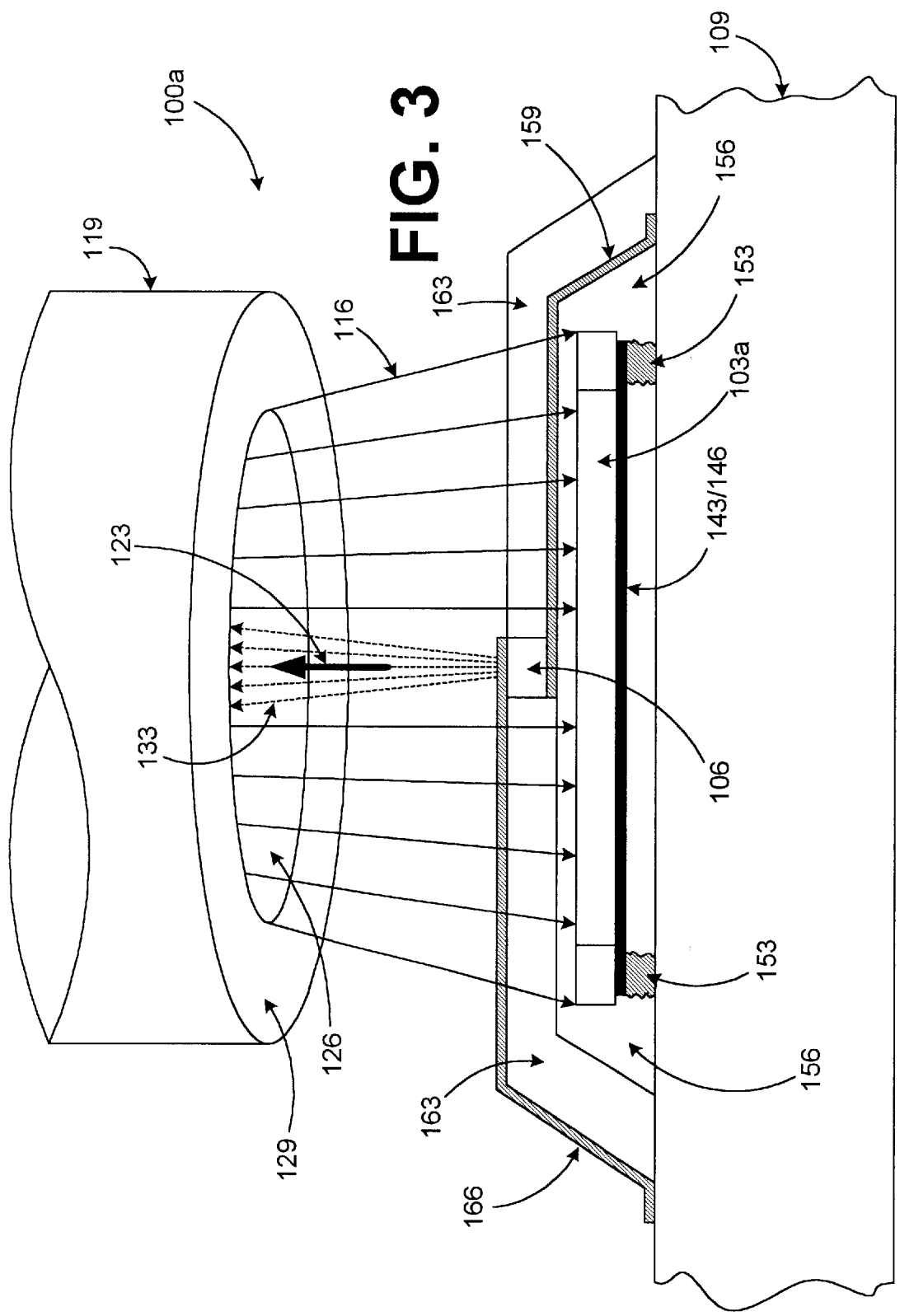

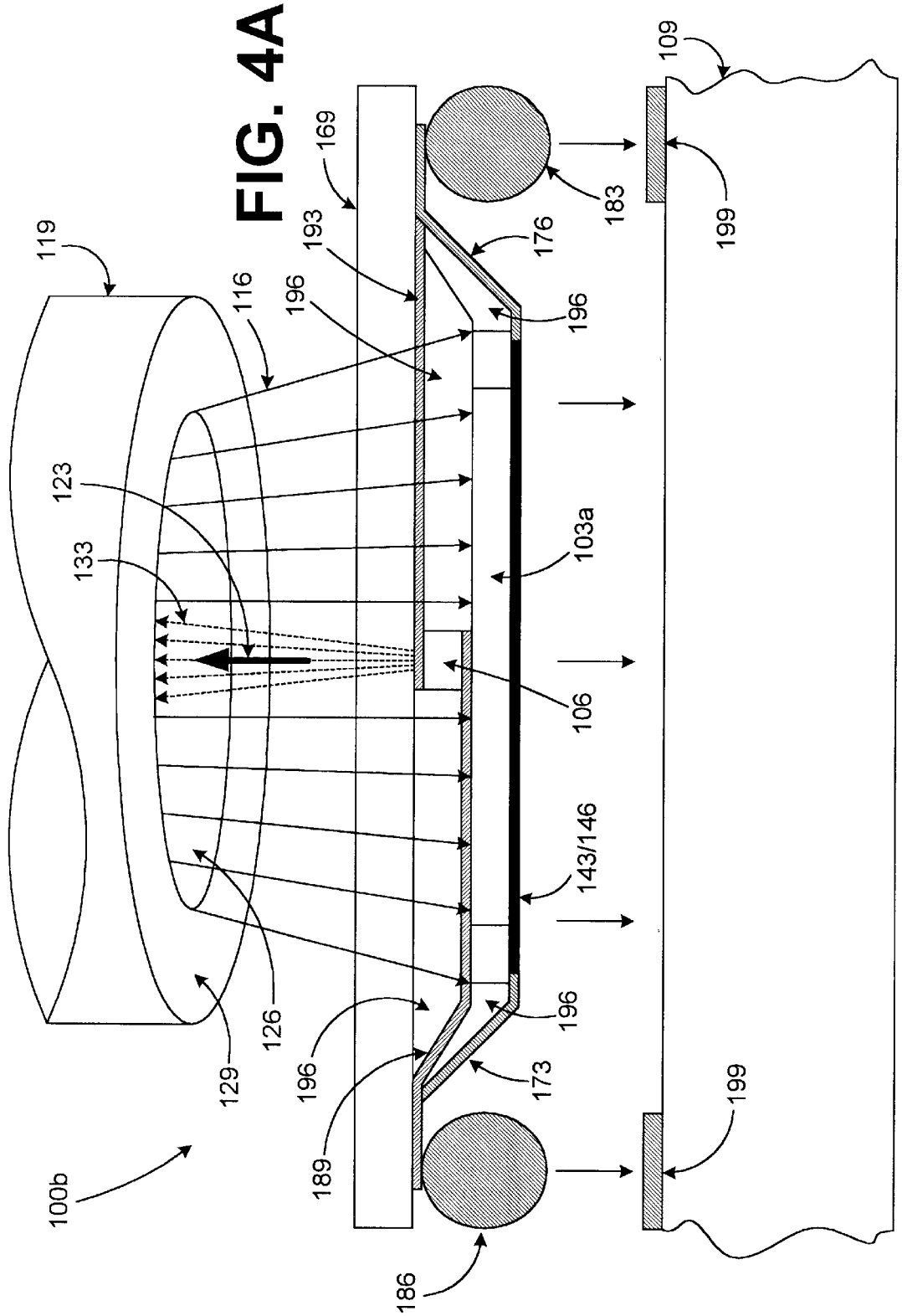

SYSTEM AND METHOD FOR BI-DIRECTIONAL OPTICAL COMMUNICATION USING STACKED EMITTERS AND DETECTORS

CROSS REFERENCE TO RELATED APPLICATION

This document claims priority to and the benefit of the filing date of co-pending and commonly assigned provisional applications entitled "A Bi-Directional Single Fiber Optical Link Using Stacked Emitters and Detectors", assigned Ser. No. 60/098,049, filed Aug. 26, 1998, and "Bi-Directional Single Fiber Optical Link Using I-MSMS", assigned serial No. 60/097,946, filed Aug. 26, 1998, both of which are hereby incorporated herein by reference.

This application is related to U.S. utility patent application entitled "System and Method for Bi-Directional Optical Communication" filed on Aug. 26, 1999, and accorded Ser. No. 09/383,883.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of EEC-9402723 awarded by the National Science Foundation of the U.S.

TECHNICAL FIELD

The present invention relates generally to the field of communications, and more particularly, to a system and method for optical bidirectional communication.

BACKGROUND OF THE INVENTION

Current communications systems and networks are becoming faster and more complex, using any one of number of mediums. Communication using these systems and networks is typically bidirectional in that signals are exchanged between two sources as they communicate for various purposes. More recently, fiber optic networks have been employed as the medium for communications. Typically, the optical fibers themselves may be very small and, consequently, coupling various devices to the optical fibers to create a communications link can be difficult and expensive.

An additional problem with current optical fiber communications systems is that optical fibers are often used for unidirectional communications. This is due in part to the difficulty of physically transmitting and receiving an optical signal on a single optical fiber that may be, for example, a single micron thick. Unfortunately, this results in the need for two optical fiber links to establish bi-directional communications.

SUMMARY OF THE INVENTION

The present invention provides a bi-directional optical link and method to facilitate bi-directional optical communications with a single optical fiber. Briefly described, the bi-directional optical link comprises a thin film detector having an upper surface facing a predetermined direction to receive incident light. Also, the link includes a thin film emitter stacked over the upper surface and oriented to direct a beam of light toward the predetermined direction. The thin film detector is relatively wide and flat, where the thin film emitter can be placed on the thin film detector while occluding only a portion of the thin film detector. Thus, the thin film detector can receive incident light from a single optical fiber facing the emitter/detector from the predetermined direction while at the same time emitting a beam of light into the same single optical fiber.

The present invention can also be viewed as providing a method for establishing a bi-directional communications link. In this regard, the method can be broadly summarized by the steps of positioning a thin film detector having an upper surface so as to face a predetermined direction to receive incident light, stacking a thin film emitter over the upper surface, and, orienting the thin film emitter to direct a beam of light toward the predetermined position.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A, is a side view drawing of a detector used in the bi-directional communications link of FIGS. 1A and 1B;

FIG. 2B is a bottom view drawing of a detector used in the bi-directional communications link of FIGS. 1A and 1B.

FIG. 3 is a drawing of a bi-directional communications link according to another embodiment of the present invention;

FIG. 4A is a drawing of a bi-directional communications link using an intermediate host according to another embodiment of the present invention.

DETAILED DESCRIPTION OF THE INVENTION

Figure 1A:
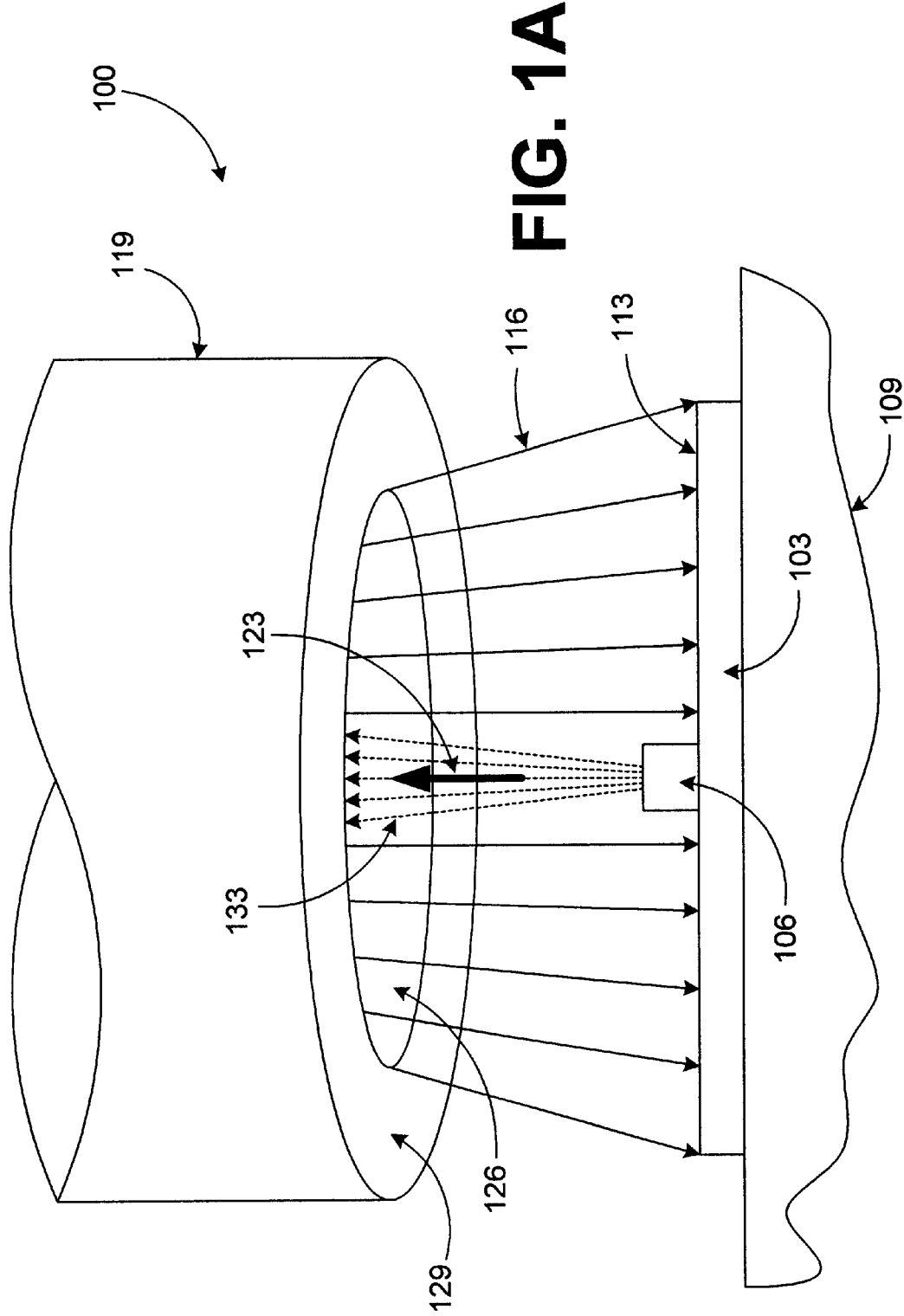
FIG. 1A is a drawing of a bi-directional communications link according to an embodiment of the present invention.

With reference to FIG. 1, shown is a bi-directional optical link 100 according to an embodiment of the present invention. The bi-directional optical link 100 includes a stacked arrangement of a thin film detector 103 and thin film emitter 106. The detector 103 is located on a host substrate 109 as shown. The detector 103 is preferably flat in shape with a relatively small thickness. The detector 103 includes an upper surface 113 oriented to receive incident light 116 from a predetermined direction 123, that is, for example, normal to the upper surface 113. The incident light 116 propagates, for example, from an optical fiber 119 as shown where the optical fiber 119 has a core 126 and a cladding 129. The emitter 106 is stacked over the detector 103. Both the detector 103 and the emitter 106 include electrical contacts from which these devices are driven. Both the detector 103 and the emitter 106 are independently optimized and bonded, for example, to a transceiver circuit (not shown) located on the host substrate 109.

The detector 103 and the emitter 106 may be bonded to the transceiver circuit using a variety of materials, including metals, conductive polymers, and conductive epoxies, etc. In addition, either thick or thin bonds may be used to adhere and electrically connect the detector 103 and the emitter 106 to a transceiver or other circuit on the host substrate 109. These thick or thin bonds may include a circuit, glass, plastic, laminate, polymer, etc.

During operation of the bi-directional optical link 100, the emitter 106 generates a beam of light 133 that propagates in the predetermined direction 123 into the core 126 of the optical fiber 119. Generally, the optical fiber 119 is positioned so as to receive the beam of light 133 and to ensure that the incident light 116 propagates from the optical fiber 119 onto the upper surface 113 of the detector 103. In other words, the end of the optical fiber 119 is positioned so as to face the detector 103 from the predetermined direction 123. Both the incident light 116 and the beam of light 133 are modulated accordingly. In this manner, the bi-directional optical link 100 advantageously allows a single optical fiber 119 to be used for bi-directional communications.

The emitter 106 may be, for example, a vertical cavity surface emitting laser or a light emitting diode (LED), or other suitable light source. The actual component chosen as the emitter 106 depends in part on the capabilities and attributes of the component and the particular application. For example, vertical cavity surface emitting lasers allow higher speed operation than LED's, but also include higher power consumption. The emitter 106 includes electrical contacts that are bonded to the host substrate 109 using suitable conductive bonding agents such as, for example, metals, conductive polymers, conductive epoxies, or other conductive bonding agents. In particular, the electrical contacts are preferably bonded to counterpart electrical contacts on the host substrate 109, where the circuit that drives the emitter 106 is also located on the host substrate 109.

The leads that run between the emitter 106 are located over the detector 103 in order to reach the emitter 106. These leads are relatively small in width resulting in minimal occlusion of the detector 103 and may be placed over a transparent insulation layer placed over the detector 103 as will be discussed. Likewise, the detector 103 includes electrical contacts that are bonded to the counterpart contacts on the substrate 109 in a similar manner to the emitter 106.

The host substrate 109 may comprise, for example, an actual circuit, glass, plastic, laminate, polymer, or other material, etc. The optical fiber 119 is held into place using suitable means.

Turning to FIG. 1B, shown is a top view of the bi-directional optical link 100. The detector 103 is spherical in shape with a diameter d, for example, that is larger than the diameter c of the 126, and, given its relatively small thickness, is in the shape of a disk. The emitter 106 is generally located over the detector 103 at a position approximately near the center of the detector 103. Interposed on the detector 103 are outlines of the core 126a and 126b of the optical fiber 119 (FIG. 1A) in first and second positions over the detector 103.

The first and second positions of the cores 126a and 126b illustrate a positioning tolerance of the bi-directional optical link 100 that is a significant advantage of the present invention. The core 126a is shown substantially centered in the detector 103, whereas the core 126b is off to the side. However, the emitter 106 is still positioned within the periphery of both cores 126a and 126b, thus resulting in the propagation of the beam of light 133 (FIG. 1A) into the core 126 of the optical fiber 119. It is a significant advantage that the optical fiber 119 need only be positioned relative to the detector 103 and the emitter 106 so as to capture the beam of light 133 generated by the emitter 106, while at the same time, illuminating enough of the detector 103 with the incident light 119 (FIG. 1A) so as to be detectable. This is due, in part, to the relatively large diameter d of the detector 103 and the relatively small size of the emitter 106. In terms of actual measurements, for example, given that the diameter c of the core 126 is approximately 1 micron, and the diameter of emitter 106 is much smaller, the core 126 may be positioned over the detector 103 off center by the positioning tolerance X. Note, however, that the emitter 106 may be any size or shape.

The size of the emitter 106 is optimized, keeping a couple of competing parameters in mind. On one hand, one wishes to maximize the size of the emitter 106 to ensure that a beam of light 133 of maximum size is generated and coupled into the optical fiber 119. On the other hand, one wishes to minimize the size of the emitter 106 to reduce the occlusion of the detector 103 by the emitter 106. Thus, the actual sizes chosen for the emitter 106 should be specified with these competing interests in mind. Specifically, one should determine the size of the emitter 106 in light of the desired strength of the beam of light 133 that is to be transmitted through the optical fiber 119 as well as a desired signal strength from the detector 103 in a worst case position of the optical fiber 119 over the detector 103.

With reference to FIGS. 2A and 2B, shown are side (FIG. 2A) and bottom (FIG. 2B) views of an inverted metal-semiconductor-metal (MSM) photodetector 103a that is preferably employed as the detector 103 (FIGS. 1A and 1B). The MSM photodetector 103a is described in detail in Jokerst, N. M. et al., *Thin Film Inverted MSM Photodetectors*, IEEE Photonics Technology Letters, Vol. 8, No. 2, (February 1996), that is incorporated herein by reference in its entirety. It is understood, however, that any detector that provides a suitable physical shape and electrical properties may be employed as the detector 103.

To provide an overview, the MSM photodetector 103a includes a first portion 139 of semiconductor material that generates photogenerated excess carriers when exposed to the incident light 119. The photodetector 103a also includes electrodes 143 and 146 with inter-digitated fingers 149. When a bias voltage is applied to the inter-digitated fingers, an electric field is formed between the adjacent fingers 149 that causes the photogenerated excess carriers to be swept from the semiconductor material into the fingers, creating a photocurrent that is proportional to the power of the incident light 119.

With respect to FIG. 3, shown is a bi-directional optical link 100a according to another embodiment of the present invention. The bi-directional optical link 100a includes a detector 103a with electrodes 143/146. The electrodes 143/146 are electrically coupled to contacts of a transceiver circuit, for example, located on the host substrate 109 via conductive "bump bonds" 153, the bump bonds being known to those skilled in the art. In fact, the bump bonds 153 are the mechanism by which the detector 103a is originally held to the host substrate 109. Thereafter, a first insulation layer 156 is placed over the detector 103a. The materials used to create the first insulation layer 156 are transparent with respect to the incident light 116 so as to allow the incident light 116 to reach the detector 103a. Such materials are generally known to those skilled in the art.

Placed on the first insulation layer 156 is a first electrical lead 159 to connect a first contact of the emitter 106 to a corresponding contact on the host substrate 109. A second insulation layer 163 is located over the first electrical lead 159 and surrounds the emitter 106. The second insulation layer 163 may be comprised of the same materials as the first insulation layer 156. A second electrical lead 166 is placed on top of the second insulation layer 163 that electrically connects a second electrical contact of the emitter 106 to a counterpart contact on the host substrate 109. Thus, the emitter 106 is driven by the transceiver circuit located on the host substrate 109 via the first and second electrical leads 159 and 166. Likewise, the photocurrent generated by the detector 103 is provided to the transceiver circuit via the electrical connections established by the bump bonds 153.

Figure 4B:
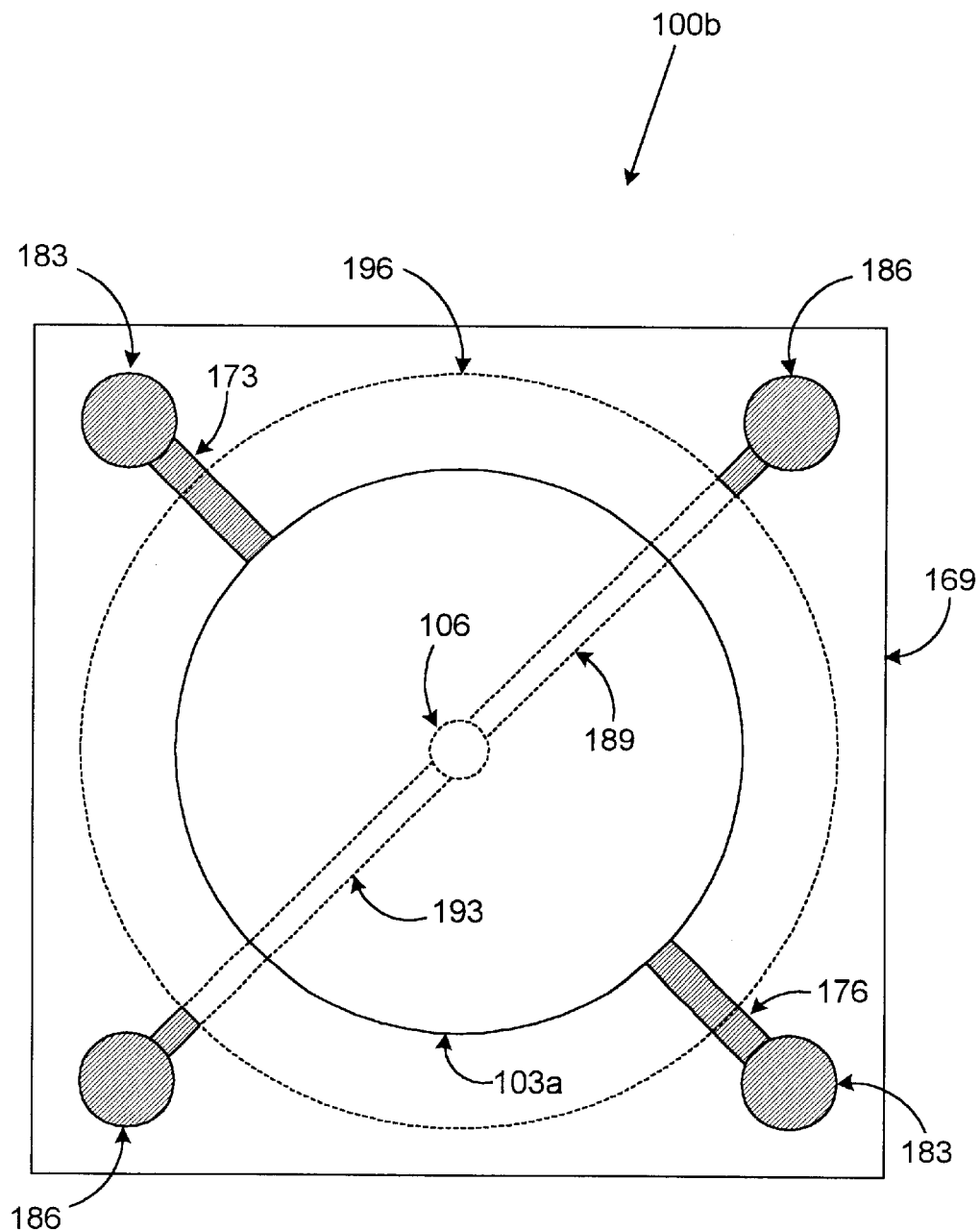
FIG. 4B is a bottom view of the intermediate host assembly of FIG. 4A.

With reference to FIG. 4A, shown is a bi-directional optical link 100b according to another embodiment of the present invention. The bi-directional optical link 100b includes a detector 103a and an emitter 106 bonded to an intermediate host 169 as shown. The detector 103a includes first and second detector leads 173 and 176 that electrically couple the electrodes 143/146 of the detector 103a to the bump bonds 183 as shown. The emitter 106 includes contacts that are coupled to bump bonds 186 via first and second emitter leads 189 and 193. Insulation material 196 is located at various points as shown to hold the various components in position. The intermediate host 169 with the detector 103 and the emitter 106 is bonded to the substrate host 109 via the bump bonds 183 and 186 that adhere to appropriate contacts 199 on the substrate host 109. The intermediate host 169 is comprised of a transparent material to allow both the beam of light 133 and the incident light 116 to travel therethrough. FIG. 4B shows a bottom view of the bi-directional optical link 100b of FIG. 4A.

Many variations and modifications may be made to the above-described embodiment(s) of the invention without departing substantially from the spirit and principles of the invention. All such modifications and variations are intended to be included herein within the scope of the present invention.

Therefore, having thus described the invention, the following is claimed:

1. A bi-directional optical link, comprising:

a thin film detector having an upper surface facing a predetermined direction to receive incident light, wherein the thin film detector is an inverted metal-semiconductor-metal photodetector, and a thin film emitter stacked over the upper surface and oriented to direct a beam of light toward the predetermined direction.

2. The link of claim 1, wherein the thin film emitter further comprises a pair of electrical connectors for electrically coupling the thin film emitter to a circuit.

3. A method establishing a bi-directional communications link, comprising the steps of:

positioning a thin film detector having an upper surface so as to face a predetermined direction to receive incident light, wherein the step of positioning a thin film detector further comprises the step of positioning an inverted metal-semiconductor-metal photodetector;

stacking a thin film emitter over the upper surface; and orienting the thin film emitter to direct a beam of light toward the predetermined position.

4. The method of claim 3, further comprising the step of providing a pair of electrical connectors for electrically coupling the thin film emitter to a circuit.

* * * * *